United States Patent [19]

Seigel

[11] 4,291,978

[45] Sep. 29, 1981

[54] APPARATUS FOR AUTOMATICALLY DETERMINING THE POSITION AT WHICH A BEAM OF LIGHT IMPINGES ON A TARGET

[75] Inventor: Harold O. Seigel, Don Mills, Canada

[73] Assignee: Scintrex Limited, Don Mills, Canada

[21] Appl. No.: 100,478

[22] Filed: Dec. 5, 1979

[51] Int. Cl.³ .................. G01B 11/26; E21B 25/16
[52] U.S. Cl. ........................... 356/152; 33/309; 33/313; 175/45; 356/148; 356/248
[58] Field of Search ............ 33/309, 313, 314, 283; 175/45; 356/141, 152, 148, 149, 248; 250/203 R, 231 SE

[56] References Cited

U.S. PATENT DOCUMENTS 2,184,931 12/1939 Straatman et al. ................. 175/45
2,317,632 4/1943 Miller ................................ 33/309
2,670,179 2/1954 Natland et al. .................... 33/314
3,916,186 10/1975 Raser .......................... 250/231 SE
3,972,621 8/1976 Eisenkopf et al. ............ 250/203 R
4,172,662 10/1979 Vogel .............................. 356/248
4,178,505 12/1979 Skagerlund ..................... 356/152

Primary Examiner—S. C. Buczinski
Attorney, Agent, or Firm—Sim & McBurney

[57] ABSTRACT

A rotating target contains an appropriately shaped section of photoelectric material which detects the position of a beam of light which is incident on the target. The position of the beam is determined in terms of its distance from the center of rotation of the target and by its angular position relative to the vertical. The vertical direction is simultaneously determined relative to the rotating target using a gravity operated reference.

14 Claims, 7 Drawing Figures

APPARATUS FOR AUTOMATICALLY DETERMINING THE POSITION AT WHICH A BEAM OF LIGHT IMPINGES ON A TARGET

BACKGROUND OF THE INVENTION

For certain applications it is necessary to determine automatically the position of a beam of light which is projected from one location onto a target at another location. Applications requiring such a device may include laser communication systems wherein the communication is by the modulation of a laser between two points, one or both of which may be moving; the alignment of mechanical structures or civil engineering works; and the measurement of the deviation of a borehole from a predetermined direction.

Without restricting the generality of the application of this invention, but with the objective of promoting the understanding of its function, the invention will be discussed in respect of the last application stated.

In borehole drilling, particularly for mineral exploration, holes of small diameter, e.g., 4.7 cm, but often of great length, e.g., 1000 m or more, may be drilled. Because of the flexibility of the long string of rods required for the drilling and the anisotropic mechanical properties of the rocks, the holes which are drilled tend to wander from their original orientation. Under unfavourable circumstances boreholes have been known to change direction by as much as 180° over their length. Since the data obtained from such boreholes normally is used to determine the economic feasibility of mining a deposit, it is readily apparent that a proper knowledge of the true path of the borehole is vital.

A number of devices have been employed in the past to map the orientation of a borehole throughout its length, but all of these have important limitations. The simplest device is a glass test tube containing some hydrofluoric acid. The test tube is lowered to a position in the borehole and retrieved after enough time for the upper surface of the acid to etch a line on the test tube. The line gives the dip of the borehole at that position. This method is very time-consuming and gives no information about the azimuth of the borehole.

More elaborate devices employ a compass and a gravity operated device which are either automatically "fixed" at the desired depth and retrieved to give the dip and azimuth of the borehole or else photographed periodically by a small, in-hole camera. In the latter instance the film, when developed, will show a series of dip and azimuth combinations. The disadvantages of these devices are that they are slow, give relatively few data points in the borehole, and cannot be used in boreholes which are metal cased or which pass through magnetite or pyrrhotite-rich rocks.

A third type of device employs gyroscopes to give a continuous measurement of dip and azimuth of the borehole. These are better than the previously mentioned types because they can give continuity of measurement, but they are not satisfactory in the smallest diameter boreholes required in mining because of the unreliability of the very small gyros required (less than 2 cm in diameter).

SUMMARY OF THE INVENTION

In accordance with one aspect of this invention there is provided apparatus which can be employed in any size borehole used in mining to give the deviation of the borehole from its original orientation in a continuous fashion, if desired, without the use of the earth's magnetic field or other external azimuth determining device.

In accordance with one aspect of this invention there is provided apparatus for determining the position at which a beam of light impinges on a target comprising a light source providing a collimated beam of light; a rotatable target spaced apart from said light source and having a surface on which said collimated beam of light impinges, a part of said surface comprising photoelectric material extending outwardly from the axis of rotation of said target towards the periphery of said target, said photoelectric material being so shaped that the angle it subtends at said axis of rotation at any distance therefrom is a function of said distance; means for rotating said target; means including gravity responsive means for providing a first electrical signal having a waveform that establishes a reference direction for any point on said surface of said target; means for deriving from said photoelectric material a second electrical signal during rotation of said target, said second electrical signal containing information with respect to the spacing between said axis of rotation and the position at which said beam of light impinges on said target as well as the angular orientation of said position with respect to said reference direction; said signal processing means for translating said first and second electrical signals to provide an output signal that determines the position at which said beam of light impinges on said target.

BRIEF DESCRIPTION OF THE DRAWINGS

This invention will be better understood by reference to the attached Figures in which.

DETAILED DESCRIPTION OF THE INVENTION INCLUDING THE PREFERRED EMBODIMENT

Figure 1:
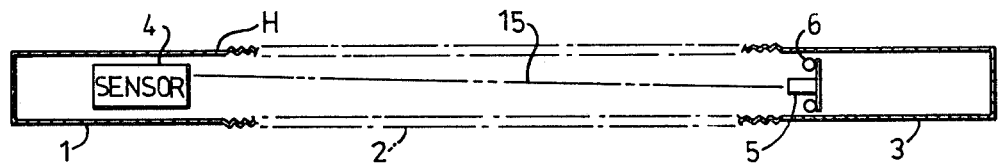
FIG. 1 shows schematically one embodiment of this invention which may be used for the determination of the deviation of a borehole from its original, predetermined orientation, either in a continuous or incremental fashion, along its length.

Referring to the drawings, particularly FIG. 1, apparatus for determining the position at which a beam of light impinges on a target is shown as including a flexible housing H which, in the embodiment illustrated, is of cylindrical configuration, and which is adapted for insertion into a borehole and is conformable to the curvature of the longitudinal axis of the borehole. Flexible housing H in the illustrated embodiment is a segmented, sealed tube with at least three flexibly linked or totally flexible sections, 1, 2 and 3. The length of the various sections is determined by the anticipated curvature of the borehole. The less the curvature expected in the borehole, the longer the segments and the more sensitive will be the determination of the deviation of the borehole. The apparatus further includes a sensor 4 and a light source 5 which provides a collimated beam of light. Additionally there is provided one or more uncollimated light sources 6. When housing H is perfectly straight, sensor 4 and light source 5 are so aligned that the beam of light from light source 5 strikes the center of a target that constitutes a part of a sensor 4. However, when flexible housing H is inserted in a curved borehole, it conforms to the curvature of the longitudinal axis of the borehole causing the beam of light from light source 5 to strike the aforementioned target off the center thereof, as is shown in FIG. 1.

Sensor 4 is located in section 1, which is at one end of the apparatus. Section 2 is an extension tube which simply links sections 1 and 3. The two light sources 5 and 6 are located in section 3, which is at the other end of the apparatus.

Source 5 produces a very narrow angle beam which is accurately directed along the projection of the central axis of section 3 towards sensor 4. Source 5 may be a coherent source, such as a laser, e.g., He Ne, or any other suitable source of collimated light. Uncollimated light sources 6 provide a general illumination down the interior of housing H onto the target of sensor 4. This target will be discussed in greater detail hereinafter. Sources 6 also may be positioned in section 2 of housing H, or even at the near end of section 1, as long as sources 6 provide a reasonably uniform illumination on the front face of the target of sensor 4.

Figure 2:
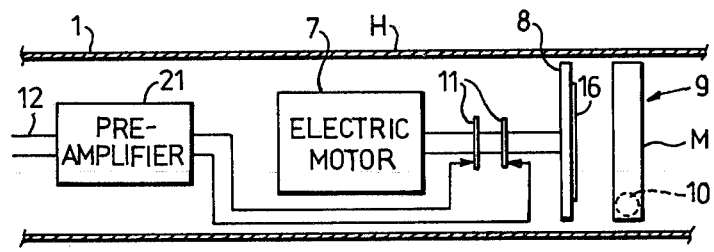
FIG. 2 shows that section of the apparatus of FIG. 1 which contains the sensor.

Sensor section 1 is shown in greater detail in FIG. 2. Sensor 4 includes an electric motor 7 which rotates a rotatable target 8 at a desired (non-critical) speed, e.g., 1,000–2,000 rpm. As will be apparent from FIG. 1, target 8 is spaced apart from light source 5.

Figure 3:
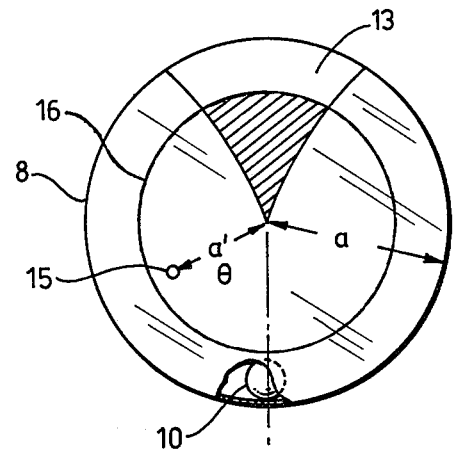
FIG. 3 is a front view of the sensor section.

As shown in greater detail in FIG. 3, which is a front view of sensor 4 showing rotating target 8, a part 13 of the surface of target 8 on which the collimated beam of light from light source 5 impinges is of photoelectric material which extends outwardly from the axis of rotation of target 8 towards the periphery of the target. The section of photoelectric material 13 is so shaped that the angle which it subtends at the axis of rotation of target 8 at any distance therefrom is a function of this distance. This is achieved by having at least one boundary of section 13 which extends outwardly from the aforementioned axis of rotation of curvilinear configuration. In the embodiment illustrated in FIG. 3 both of the boundaries of section 13 extending outwardly from the axis of rotation of target 8 are of curvilinear configuration. Any suitable photoelectric material may be employed, e.g., cadmium sulfide or silicon.

The apparatus further includes some form of gravity responsive device which will establish a reference direction for any point on the surface of target 8. In the embodiment illustrated the gravity responsive device 9 includes an object 10 located between target 8 and light source 6, this object being constrained such that the position thereof is determined by the force of gravity acting thereon. In the illustrated embodiment object 10 is a small, spherical ball made of polished metal, for example. The constraint for ball 10 is a hollow cylindrical member M that is coaxially mounted in a fixed position with respect to target 8 and which is formed by two, spaced, transparent sheets e.g., of glass, and an annular separating wall. Ball 10 is located within member M and is free to move about therein. Ball 10 obviously is constrained such that its position is determined by the force of gravity and seeks the lowest point of the chamber defined by the walls of member M, thereby providing the necessary vertical direction reference, as will be more apparent hereinafter. Other gravity operated devices may be employed to the same end. For example, a ball or other object may be suspended in the manner of a plumb bob, or the aforementioned chamber may be almost filled with the liquid, the bubble remaining in the liquid providing the required vertical direction reference. Electrical signals developed by target 8 are picked up by means of slip rings 11, amplified by a preamplifier 21 and transmitted via cables 12 to the top of the borehole.

Referring again to FIG. 3, in a preferred embodiment of the instant invention a filter 16 is provided. In the illustrated embodiment filter 16 is concentric with target 8 and member M and may be mounted either on member M or on the face of target 8 itself. Filter 16 passes light from source 5, but not from sources 6. To this end it is necessary for sources 5 and 6 to produce light of different wavelengths. It will be seen that filter 16 permits light from source 5 to impinge on the surface of target 8 containing photoelectric material 13 but inhibits light from source 16 from impinging on this surface of the target except on the part of the aforementioned surface of target 8 on which the shadow of ball 10 falls as target 8 rotates. This objective also can be achieved merely by having filter 16 cover the shaded part of section 13.

In order to distinguish the light from sources 5 and 6, the light from source 5 may be modulated at a relatively high frequency, e.g., 500 Hz, compared to the frequency of rotation of target 8. Alternatively, the light from source 6 may be modulated and the light from source 5 left unmodulated.

Figure 4:
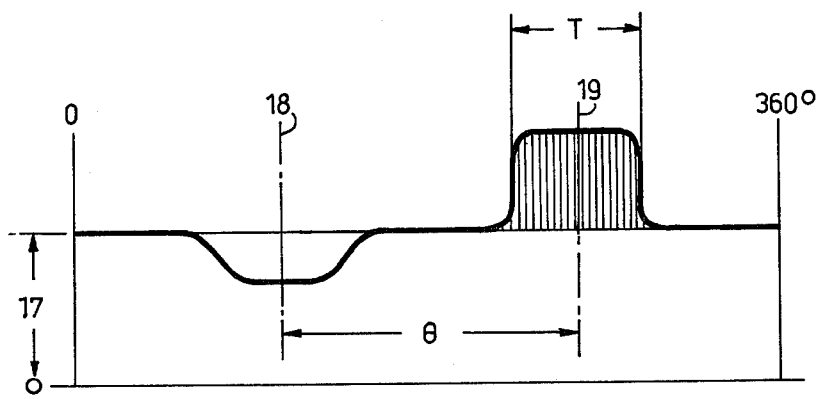
FIG. 4 illustrates the electrical output from the sensor.

The electrical signals picked up by slip rings 11 are shown in FIG. 4 for one complete rotation of target 8. There will be a "steady state" output 17 due to the light from sources 6 impinging on the part of photoelectric section 13 not covered by filter 16. When section 13 sweeps past ball 10 a first electrical signal is produced that establishes a reference direction (the vertical direction) for any point on the surface of target 8 that faces the light sources 6. This is shown as a negative-going pulse indicative of a period of reduction of output and having its centre at time 18. When the modulated, collimated light beam 15 from source 5 is intersected by section 13, there will be a modulated increase in light output in the form of a positive-going pulse having a time duration T and a midpoint at time 19. The phase difference $\theta$ between midpoints 18 and 19 is precisely the angle between the radii subtended at the centre of rotation of target 8 by the point of intersection of light beam 15 with target 8 and ball 10. The duration T of the signal is a function of the distance $a'$ (FIG. 3) from the axis of rotation of target 8 to the point of intersection of beam 15 with target 8. By properly curving one or both boundaries of section 13 that extend outwardly from the axis of rotation of target 8, the angle subtended from the boundaries at any radius can be made directly proportional to the radius, so that T will be directly proportional to $a'$. It will be apparent from the foregoing that the rotation of target 8 also results in the production of a second electrical signal containing information with respect to the spacing between the axis of rotation of target 8 and the position at which the beam of light from source 5 impinges on target 8 as well as the angular orientation of that position with respect to the reference direction.

The purpose of modulating light source 5 is simply to permit the contribution to the photoelectric output from sources 5 and 6 to be resolved. This is important for those times where, at the same time, the shadow of ball 10 and the beam of light from source 5 fall on section 13. With the light from source 5 modulated and the light from source 6 unmodulated, or vice-versa, the signals may be separated to provide meaningful information.

Filter 16, which excludes light from source 6 from all but an annular ring in which the shadow of ball 10 lies simply increases the percentage reduction of the output at time 18, making this position easier to determine.

Figure 5:
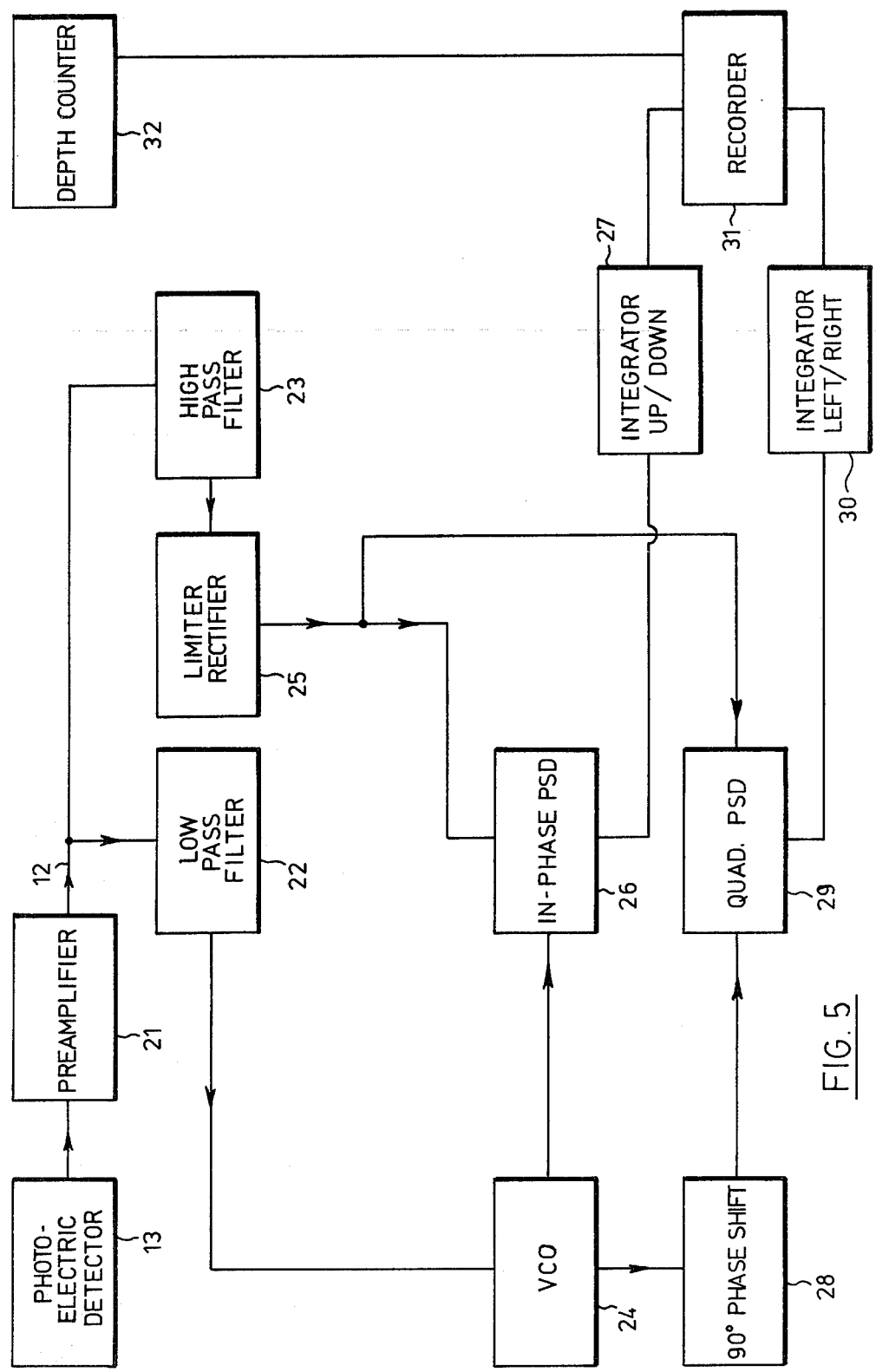
FIG. 5 is a block diagram of an electronic network which is used to process the electrical output from the sensor in order to determine the desired information regarding the position of the light beam.

A signal processing network for translating the aforementioned two electrical signals to provide an output signal that determines the position at which the beam of light from source 5 impinges on target 8 is shown in block diagram form in FIG. 5. The network of FIG. 5 is merely representative of one of a number of electronic circuits that could be employed for this purpose. Referring to FIG. 5, the output of photoelectric section 13 is amplified by preamplifier 21 and is supplied via cable 12 to the top of the borehole. At this point it is resolved, by a low pass filter 22 and a high pass filter 23 into components generated respectively by light sources 6 and 5. The output of filter 22 has a waveform which contains the information relating to the position of ball 10, i.e., the vertical direction. It passes to a voltage controlled oscillator 24 in which a sinusoidal waveform is produced which is synchronized with the vertical indication and thus provides a time or phase reference. The output of high pass filter 23, which is the modulated waveform resulting from the detection of the collimated beam of light by photoelectric section 13, passes to a limiter-rectifier 25 where the waveform is rectified and "clipped" or "squared" to a constant amplitude. The squared pulse has the time duration T. It is supplied to a phasesensitive detector 26. A direct output of the voltage controlled oscillator 24 controls phase sensitive detector 26. The output of phase sensitive detector 26 is a direct current signal whose amplitude is $T \cos \theta = Ka' \cos \theta$, i.e., a constant times the vertical deviation of the point of intersection of light beam 15 with target 8. The output of phase sensitive detector 26 either is positive or negative, and this determines the quadrant of target 8 intersected by beam 15. With target 8 rotating in the direction shown in FIG. 3, the output of phase sensitive detector 26 will be positive when beam 15 intersects target 8 below the axis of rotation and negative when it intersects target 8 above the axis of rotation. The vertical deviation of the centre of the light source section of the apparatus from that of the sensor section of the apparatus actually is the negative of the output of phase sensitive detector 26. In other words, if the beam from source 5 strikes target 8 above its axis of rotation, then, of course, the curvature of the borehole is downward.

An output of voltage controlled oscillator 24 is supplied to a 90° phase shifter 28 whose output waveform, in turn, provides a phase reference for a second phase sensitive detector 29 which operates on the signal from limiter rectifier 25 to produce a direct current signal whose amplitude is $T \sin \theta = Ka' \sin \theta$. This output therefore is a constant times the horizontal deviation of the point of intersection of light beam 15 with target 8 and, in turn, is the negative of the actual horizontal deviation of the centres of the two end sections 1 and 3 of the apparatus. Again, the sign of the direct current output of phase sensitive detector 29 will locate the point of intersection of light beam 15 with target 8 either to the left or right of its axis of rotation.

The outputs of phase sensitive detectors 26 and 29 are progressively summed in integrators 27 and 30 respectively to provide a running indication of the cumulative deviations (up/down and left/right) of the borehole along its length. These sums are recorded by a recorder 31, which may be a dual channel analogue recorder, a digital printer, or a magnetic tape recorder, together with the output from a depth counter 32 which indicates the depth at which the accumulated deviations apply.

While the data processing and presentation described hereinbefore basically function in terms of polar coordinates, the output may be presented in three-dimensional Cartesian coordinates by the addition of a microprocessor.

It should be appreciated that other means for indicating the vertical may be provided without departing from the instant invention. For example, if the mass of target 8 is made deliberately to be eccentric in a known fashion, there will be a sinusoidal variation of torque on drive motor 7 which rotates target 8. If the torque waveform is detected, e.g., by observing the current drawn by motor 7, an indication will be obtained from that waveform of the direction of gravity relative to any point on target 8.

The embodiment of the invention just described in detail relating to the borehole deviation measuring device simply records the borehole deviation. In other embodiments of the invention the output of sensor 4 may be used to control certain positioning or orienting devices in order to ensure that light beam 15 falls on the centre of target 8. The significance of this might be that it is desired to transmit information from source 5 to target 8 through the modulation of light beam 15. Thus, referring to FIG. 6, one such embodiment of the invention is illustrated. Light beam 15 is incident on target 8 of sensor 4. The electrical output of sensor 4 is split and detected separately in the manner shown in FIG. 5 in up/down phase sensitive detector 26 and left/right phase sensitive detector 29. The electrical output of detector 26 is used to drive a servo motor 33 which raises or lowers an assembly in which target 8 is mounted, thus seeking a null output from phase sensitive detector 26. Similarly the electrical output from phase sensitive detector 29 is used to drive a servo motor 34 which moves an assembly in which target 8 is mounted to the right and left to seek a null output from phase sensitive detector 29. The net effect of the operation of both servo motors is to move target 8 in such a way as to keep light beam 15 always incident on the centre 14 of target 8. A photodiode may be positioned at the centre of target 8 to receive any information inherent in the modulation of the source producing light beam 15.

Figure 6:
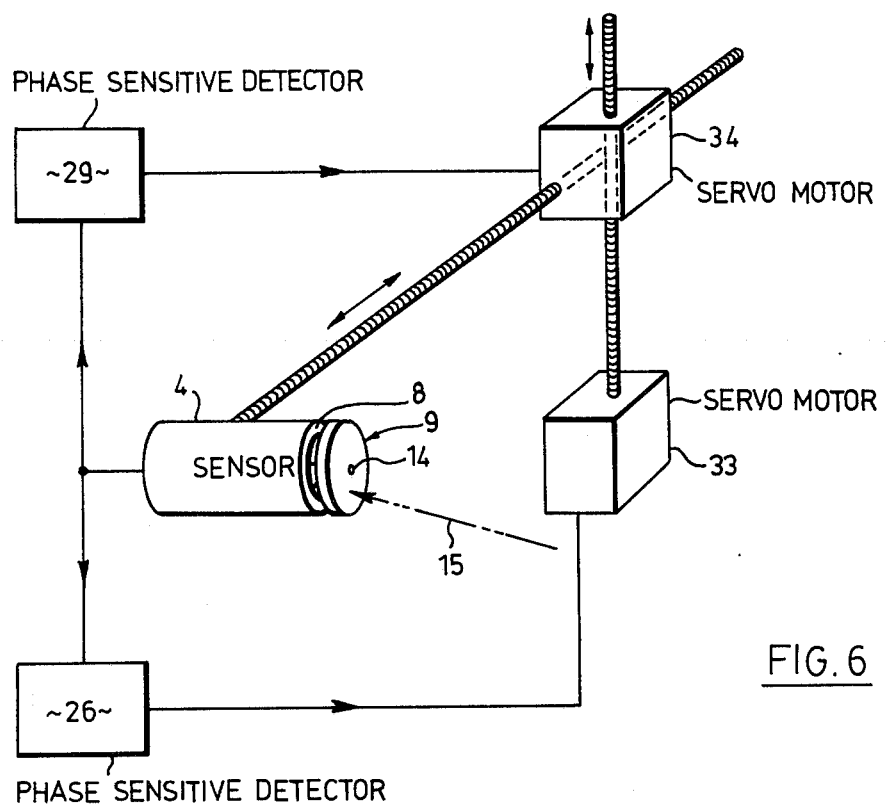
FIGS. 6 and 7 illustrate embodiments of the invention in which the positions of the light source and target are controlled.
Figure 7:
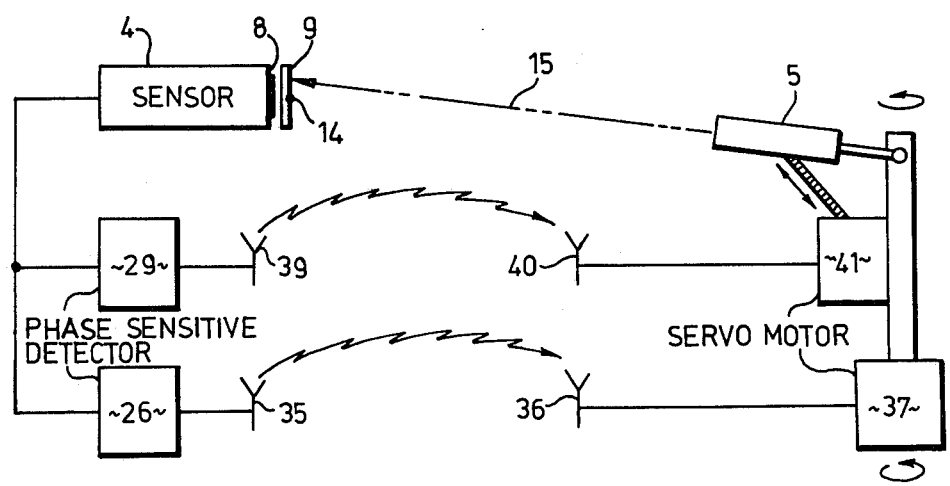

For other applications of the invention there may be too much relative movement between target 8 and light beam 15 for the embodiment of FIG. 6 to keep light beam 15 on the centre 14 of target 8. In this event the embodiment of the invention shown in FIG. 7 may be used. Referring to this Figure, the vertical and horizontal deviations of light beam 15 from centre 14 of target 8 are determined by phase sensitive detectors 26 and 29 in the manner hereinbefore described. The output of phase sensitive detector 26 is transmitted via a radio transmitter 35 to a radio receiver 36 located at the position of the source of light beam 15. The signal received by receiver 36 is used to operate a servo motor 37 which rotates about a vertical axis an assembly on which source 5 is mounted, the result of this rotation being to seek a null in the output of phase sensitive detector 26. Similarly the output of phase sensitive detector 29 is transmitted via a radio transmitter 39 to a receiver 40. The output from receiver 40 operates another servo motor 41 which raises or lowers the angle of source 5, thus seeking a null of the output of phase sensitive detector 29. The net effect of both servo motors is to bring the point of impingement of beam 15 on target 8 into the centre 14 of the target, thus facilitating the transmission of information via beam 15.

Those skilled in the art will appreciate that changes and modifications may be made without departing from the spirit and scope of the invention as defined in the appended claims.

I claim:

1. Apparatus for determining the position at which a beam of light impinges on a target comprising a light source providing a collimated beam of light; a rotatable target spaced apart from said light source and having a surface on which said collimated beam of light impinges, a part of said surface comprising photoelectric material extending outwardly from the axis of rotation of said target towards the periphery of said target, said photoelectric material being so shaped that the angle it subtends at said axis of rotation at any distance therefrom is a function of said distance; means for rotating said target; means including gravity responsive means for providing a first electrical signal having a waveform that establishes a reference direction for any point on said surface of said target; means for deriving from said photoelectric material a second electrical signal during rotation of said target, said second electrical signal containing information with respect to the spacing between said axis of rotation and the position at which said beam of light impinges on said target as well as the angular orientation of said position with respect to said reference direction; and signal processing means for translating said first and second electrical signals to provide an output signal that determines the position at which said beam of light impinges on said target.

2. Apparatus according to claim 1 wherein said photoelectric material has at least one boundary extending outwardly from said axis of rotation that is curvilinear.

3. Apparatus according to claim 1 wherein said photoelectric material has two curvilinear boundaries extending outwardly from said axis of rotation.

4. Apparatus according to claim 1 wherein said angle subtended at said axis of rotation is directly proportional to said distance.

5. Apparatus according to claim 1 wherein said gravity responsive means includes an object located between said target and said light source, said object being constrained such that the position thereof is determined by the force of gravity acting thereon, said means for providing said first electrical signal including means for generally illuminating said target and said object, said object being so located relative to said target and said illuminating means that the shadow of said object falls on a part of said photoelectric material as said target rotates.

6. Apparatus according to claim 5 wherein said gravity responsive means includes a hollow cylindrical member coaxially mounted with respect to said target, said object being a spherical ball within said member and free to move about therein, said member being constructed to permit passage of light therethough from said illuminating means and from said light source.

7. Apparatus according to claim 5 wherein the wavelengths of light emitted from said light source and from said illuminating means are different and further including filter means covering a part of said photoelectric material, said filter means permitting light from said light source to impinge on said surface of said target but inhibiting light from said illuminating means from impinging on said surface of said target except on at least the part of said surface of said target on which said shadow of said object falls as said target rotates.

8. Apparatus according to claim 1 wherein said signal processing means derive from said first and second electrical signals, output signals having amplitudes given by the formulae $Ka' \cos \theta$ and $Ka' \sin \theta$ where K is a constant, $a'$ is a distance equal to the distance between said axis of rotation and the position at which said beam of light impinges on said target and $\theta$ is the angle between said reference direction and a line drawn between said axis of rotation and the position at which said beam of light impinges on said target.

9. Apparatus according to claim 1 wherein said light source, said target and said means for rotating said target are located within a flexible housing adapted for insertion into a borehole and conformable to the curvature of the longitudinal axis of said borehole.

10. Apparatus according to claim 1 including means for varying the position of said light source to vary the position of impingement of said beam of light on said target, and means connecting said signal processing to said varying means to automatically maintain said beam impinging at a predetermined location on said target.

11. Apparatus according to claim 10 wherein said predetermined location is the center of said target.

12. Apparatus according to claim 1 including means for varying the position of said target to vary the position of impingement of said beam of light on said target, and means connecting said signal processing to said varying means to automatically maintain said beam impinging at a predetermined location on said target.

13. Apparatus according to claim 12 wherein said predetermined location is the center of said target.

14. Apparatus according to claim 5 including means for modulating light from one of said light source and said illuminating means.

* * * * *